United States Patent
Armbruster (10) Patent No.: US 10,967,301 B2
(45) Date of Patent: Apr. 6, 2021

(54) SETTLING TANK AND METHODS FOR GUIDING PARTIAL FLOWS IN THE INFLOW AREA OF SETTLING TANKS

(71) Applicant: Hydrograv GMBH, Dresden (DE)

(72) Inventor: Martin Armbruster, Dresden (DE)

(*) Notice: Subject to any disclaimer, the term of this patent is extended or adjusted under 35 U.S.C. 154(b) by 0 days.

(21) Appl. No.: 16/445,655

(22) Filed: Jun. 19, 2019

(65) Prior Publication Data
US 2020/0054969 A1    Feb. 20, 2020

(30) Foreign Application Priority Data
Aug. 14, 2018   (EP) .................................. 18000674

(51) Int. Cl.
| | | |
|---|---|---|
| B01D 21/00 | (2006.01) | |
| B01D 21/24 | (2006.01) | |
| B01D 21/30 | (2006.01) | |
| B01D 21/34 | (2006.01) | |

(52) U.S. Cl.
CPC ..... B01D 21/0087 (2013.01); B01D 21/0003 (2013.01); *B01D 21/0024* (2013.01); *B01D 21/0072* (2013.01); *B01D 21/24* (2013.01)

(58) Field of Classification Search
CPC ........ B01D 21/06; B01D 21/00; B01D 21/08; B01D 21/24; B01D 21/2411; B01D 21/2416; B01D 2221/04; B01D 21/0087; B01D 21/0003; B01D 21/0024; B01D 21/0072; B01D 21/302; B01D 21/34; B01D 21/2405; C02F 1/38; C02F 1/52
USPC ....................................... 210/801, 532.1, 519
See application file for complete search history.

(56) References Cited

U.S. PATENT DOCUMENTS

| | | |
|---|---|---|
| 2,098,467 A | 11/1937 | Sayers et al. |
| 2,140,059 A | 12/1938 | Simonsen |
| 3,523,889 A | 8/1970 | Eis |
| 3,951,816 A | 4/1976 | Bascope et al. |
| 4,014,791 A | 3/1977 | Tuttle |

(Continued)

FOREIGN PATENT DOCUMENTS

| | | |
|---|---|---|
| DE | 1045931 B | 12/1958 |
| DE | 4431369 A1 | 4/1996 |

(Continued)

*Primary Examiner* — Nam X Nguyen
*Assistant Examiner* — Ekandra S. Miller-Cruz
(74) *Attorney, Agent, or Firm* — David A. Guerra (57) ABSTRACT

A settling or sedimentation tank including inlet structures arranged, through whose inlet opening the suspension to be separated flows to the tanks, the height of which can be variably adjusted. In addition to the height variability of the inlet opening, the volumetric flow flowing out of the inlet structure can, depending on the actual load, be directed by forming a horizontally flow-through inlet opening or a vertically flow-through inlet opening and can optionally be divided into horizontal and vertical partial flows $Q_I$ and $Q_{II}$. As a result of the horizontal inflow, the capacity of the sedimentation tank increases at high loads, and as a result of the vertical inflow, the volume flow through the sedimentation chamber and the turbulent energy in the sedimentation chamber decrease at low loads, so that the retention of fine suspension in the sedimentation tank is increased and thus the effluent quality is improved.

20 Claims, 6 Drawing Sheets

(56) References Cited

U.S. PATENT DOCUMENTS

| | | | |
|---|---|---|---|
| 4,038,186 A | | 7/1977 | Potter et al. |
| 4,222,879 A | | 9/1980 | Hill |
| 4,915,823 A | | 4/1990 | Hall |
| 5,620,600 A | | 4/1997 | Degremont |
| 6,099,743 A | * | 8/2000 | Pedersen ................ B01D 21/01 |
| | | | 210/801 |
| 6,315,131 B1 | | 11/2001 | Terrien et al. |
| 6,321,916 B1 | | 11/2001 | Rickelm et al. |
| 6,365,040 B1 | | 4/2002 | Botsch |
| 8,087,518 B2 | * | 1/2012 | Kwon ................ B01D 21/0042 |
| | | | 210/519 |
| 8,197,697 B2 | | 6/2012 | Triglavcanin |
| 8,550,258 B2 | | 10/2013 | Bara et al. |
| 9,004,294 B2 | | 4/2015 | Bara et al. |
| 9,816,240 B1 | | 11/2017 | Tesvich |
| 10,094,091 B1 | | 10/2018 | Tesvich |
| 2005/0194322 A1 | * | 9/2005 | Palmer ............... B01D 21/2444 |
| | | | 210/715 |
| 2005/0211607 A1 | * | 9/2005 | Armbruster ............ B01D 21/34 |
| | | | 210/97 |

FOREIGN PATENT DOCUMENTS

| | | | | |
|---|---|---|---|---|
| DE | 19852204 A1 | | 5/2000 | |
| EP | 0923971 A1 | | 6/1999 | |
| EP | 1607127 B1 | | 12/2005 | |
| GB | 867948 A | | 5/1961 | |
| JP | S56163705 A | * | 12/1981 | ............ B01D 21/08 |
| JP | 594407 A | | 1/1984 | |
| JP | 20000325706 A | | 11/2000 | |

\* cited by examiner

SETTLING TANK AND METHODS FOR GUIDING PARTIAL FLOWS IN THE INFLOW AREA OF SETTLING TANKS

CROSS-REFERENCE TO RELATED APPLICATION

The present application claims priority under 35 U.S.C. 119(a) to European (EP) patent application number 18000674.4 filed on Aug. 14, 2018, which EP patent application 18000674.4 is incorporated herein by reference in its entirety.

BACKGROUND

Technical Field

The present technology concerns a settling tank which serves at least temporarily to separate an at least two-phase suspension, in particular to separate sewage sludge as a mixture of the solid of the purifying biomass and of the fluid the purified clear water, whereat a total volume flow $Q_{IN}$ flowing into the settling tank through at least one inlet opening according to its shape and arrangement, whereat the total volume flow $Q_{IN}$ is composed of the sum of at least two partial flows $Q_C$ and $Q_R$ and whereat the light phase separated from the heavy phase flows off with the partial flow $Q_C$ from the settling tank. At the same time, the separated heavy phase causes the thickened suspension concentrate, which removes it with the partial flow $Q_R$. The inflow in the settling tank is guided though at least this one inlet opening that is adjustable to an ideal energy system due to the change of the relative position of its boundary to each other and their absolute position in the settling tank. The present technology also pertains to a procedure for guiding partial flows in the inflow area of such settling tanks by controlling the shape, size and/or arrangement of the inlet opening.

Background Description

Such settling tanks are used worldwide in biological treatment stages of wastewater treatment plants, for example as primary, intermediate and secondary clarifiers. The solids are separated from a partial flow $Q_C$ of a suspension flowing with the total flow $Q_{IN}$ and removed from the settling tank in concentrated form in the partial flow $Q_R$. Especially in the secondary clarifier, the efficiency of this separation of the solid from the partial flow $Q_C$ plays a decisive role in the overall success of wastewater treatment. A suspension with biomass in a concentration of about 2,500 mg/l to 4,000 mg/l typically flows with the inlet flow $Q_{IN}$ into the secondary clarifier, if only a few milligrams per liter of non-separated biomass are discharged from the secondary clarifier. The purified wastewater in the clear water effluent flow $Q_C$ clouds the overall success of the wastewater treatment plant, especially in regard to the retention of phosphorus and carbon compounds. In the range of average effluent concentrations in the outflow $Q_C$ between approx. 5 mg/l and 10 mg/l filterable substances in rather well designed inlet structures and approx. 15 mg/l to 20 mg/l in only average to moderately well designed tanks, a reduction of the filterable substances in $Q_C$ even by a few milligrams per liter represents a considerable improvement. Increasingly, secondary clarifiers today are equipped with inlet structures according to European Patent No. EP 1607127 B1, the inflow from the inlet structure is essentially guided horizontally through an inlet opening, which can be adjusted to an energetic optimum by changing the relative and absolute position of its boundaries.

Both $Q_C$ and $Q_R$ are variable sizes. For example, the clear water discharge $Q_C$ of the wastewater treatment plant increases from night to day and in particular from dry weather to rainy weather. The return flow rate $Q_R$ is often controlled to the outflow of the wastewater treatment plant $Q_C$ and therefore fluctuates accordingly. The target value for the ratio $Q_R/Q_C$ in such an arrangement is typically around 0.5 to 0.75. However, $Q_R$ is often limited in terms of both minimum and maximum in the aspect of machine technology. This means that the return flow rate $Q_R$ in low load times can be much higher than the clear water discharge $Q_C$ and thus $Q_R/Q_C \gg 1.0$ applies. The negative consequence of this is that a much larger partial volume flow $Q_{int} \gg Q_C$ from the total volume flow $Q_{IN}$ is piped through the tank depending on the discharge direction from the inlet opening than the part $Q_C$ to be passed through the tank as required by the process.

The volume flow $Q_{IN} = Q_C + Q_R$ flows out of the inlet structure through the inlet opening into the settling tank. The design of the inlet opening can be distinguished according to the direction in which $Q_{IN}$ flows into the settling tank. The two essential variants are a predominantly vertical or a predominantly horizontal discharge direction. Each flow-through surface is defined by its non-flowable edges, which limit it. A horizontally flowable surface therefore has at least one higher and one lower edge, a vertically flowable surface has at least two edges, which reside on the same or on at least similar elevation.

An essentially vertically guided inflow direction is particularly common in the Anglo-American region and is described in U.S. Pat. No. 4,222,879 A, for example. An essentially horizontal discharge direction is often used in Europe and is described for example in European Patent No. EP 1607127 B1. The two variants have in common that parts of the devices, e.g. "Stilling well" and "deflector baffle" in the US publication or, for example, "inlet pipe", "pipe ring" and "ring plate" in the European publication each form an area, which is flowed through before the suspension enters the area through the inlet opening in which the settling process takes place. This space or the resulting device forms the so-called inlet structure of the settling tank.

For the sake of completeness it should be mentioned that with shield or belt clearing and with suction clearing there are at least two essential basic and thereof various detail variants of the outlet of the return sludge flow $Q_R$, which, however, just like the form of the settling tanks themselves, whether round or angular or any different geometric design as well as the type of discharge of the treated wastewater $Q_C$, has no influence on inventive tasks whose task lies in the supply line of $Q_{IN} = Q_C + Q_R$ into the tank.

The inlet structure has several tasks. The two most important ones are the targeted destruction ("dissipation") of the kinetic energy of the inflowing volume flow necessary for the transport of the suspension to the inlet structure on the one hand and on the other hand the assurance of the ideally uniform and equally distributed inflow of the suspension to the inlet opening—i.e. to the interface between the inlet structure and the settling chamber. The area of the settling tank in which the settling processes take place shall be defined as the settling chamber. This is the space horizontally next to or around the inlet structure. The interior of the inlet structure, the space below the structures of the inlet structure and the space in the so-called sludge funnel do not belong to the settling chamber of the settling tank according to this definition. The space below the inlet structure and the space of the sludge funnel belong neither to the inlet structure nor to the settling chamber.

The inflow from the aeration tank to the secondary clarifier, i.e. into the inlet structure, typically occurs at high speed and thus high kinetic energy, typically at maximum flow rates of approx. 70 cm/s to 1.5 m/s, in order to avoid settling processes. The measure of the optimum inlet velocity at the inlet opening and thus into the settling chamber of the settling tank whereas, does not result from aspects of high energy to avoid settling, but on the contrary from aspects of avoiding disturbances of the settling processes by optimizing for minimum energy input. A deterministic measure of the energy flow at the inlet opening is the densimetric Froude number $F_D$. If $F_D=1$, the sum of the pressure component of the potential energy flow and the kinetic energy flow into the settling tank is minimal. From this consideration, a given linear expansion $L_{IN}$ of the inlet opening results in an energetically optimal inlet expansion of $h_{opt}=(Q^2_{IN}/B^2_{IN}/g')^{1/3}$ depending on the current inflow $Q_{IN}$ and the densimetrically effective lift acceleration g'. Since physically unnecessary energy inputs in the settling tank lead to counterproductive turbulence and mixing processes, an inflow with $F_D=1$ or with $h_{opt}$ is obviously optimal because of the minimum energy input required for transport. Depending on the boundary conditions, the flow velocity through the inlet opening in secondary clarifiers is load-dependent ideally approx. 4 cm/s to 8 cm/s, under the condition of $F_D=1$. Thus the inlet structure obviously has the first important function to destroy the kinetic energy flow $E_k=\frac{1}{2}QU^2$, which at the inlet into the inlet structure can still amount to over a thousand times or over 99.9% of the optimal kinetic energy flow at its outlet ($150^2/4^2 \gg 1,000$), within its volume. In addition to the feature "size of the inlet structure" which must considerably exceed the size of the inlet pipe in terms of diameter or the enclosed space in order to achieve the desired braking ratio and energy dissipation effect. The focus of the design is on the geometric design of the inlet structure and the inlet opening itself as well as on flow-promoting installations and extensions such as perforated plates, deflectors, orifice plates and lamellae. Consequently, an inlet structure is a separate, large-volume structure that is not comparable to a pipe.

The inflow into a secondary clarifier is always highly turbulent with Reynolds number Re$\gg$500. For settling tanks, the turbulent kinetic energy entering therewith has the negative feature of destabilizing flows, especially at their phase boundary, which is called sludge level in secondary clarifiers. The consequence of the turbulent destabilization of the sludge level is that fine suspended particles are whirled into the clear water and subsequently discharged with the volume flow $Q_C$. The destabilizing turbulent kinetic energy entered into the settling chamber increases with increasing volume flow. Therefore, any partial volume flow unnecessarily guided through the settling tank leads to an avoidable release of fine suspended particles at the phase boundary.

EP 1607127 B1 is designed to minimize both the energy input of buoyancy energy $E_b$ and the pressure component $E_p$ and finally the kinetic energy flow $E_k$. For this purpose, the shape of the inlet structure and the inlet opening is continuously adapted by variable flow boundaries in such a way that $E_b=0$ and $F_D=1$ occur at any time and at any current load of the settling tank and that the inflow $Q_{IN}$ takes place largely horizontally out of the inlet structure directly into the settling chamber of the tank. Thus, the technology described ensures that the minimum energy flow $E_k$, which is unavoidable even with energetic optimization, is not introduced diagonally or even vertically into the thickened suspension, where it would stir up and thus re-suspend parts of the already separated solid, especially in phases of high load, i.e. high $Q_C$. Such a resuspension would have the disadvantage of considerably increasing the internal tank load again, especially with high external load $Q_C$.

Despite long research work in this area and various fundamental improvements, these tanks still do not function optimally, especially with small $Q_{IN}$. Their separation performance is still unsatisfactory in some situations in relation to the space available to them. In particular, the discharge values of the lighter phase, which is to be clarified, can be further reduced with small $Q_C$. Thus, the state of the art with vertical introduction of $Q_{IN}$ into the settling tank has the obvious disadvantage that, as described, the unavoidable inlet energy swirls up already settled solids again and thus considerably increases the settling tank load caused by resuspension. The settling tank fails significantly earlier when the incoming suspension exits the inlet structure vertically when the $Q_C$ increases, i.e. when the absolute $Q_C$ loads are significantly lower than with a horizontal outlet. The disadvantage of vertically entering the inflow arises in the state of the art, especially at high load with high $Q_C$. Accordingly, there are clear disadvantages for a horizontal discharge, especially at low load: the amount of $Q_C$ in the treated wastewater to be separated from sludge is small and the sludge level lies therefore very deep in the tank. However, the minimum volume flow $Q_R$ remains high in accordance with the technical restrictions of the machine. The volume flow $Q_{IN}=Q_C+Q_R$ thus remaining high, is now directed horizontally at low load (small $Q_C$) with high turbulent energy directly into the sludge-poor or at low load even into the sludge-free settling chamber. The result is destabilization caused by turbulence and thus a too high entry of fine suspension into the clear water. This disadvantage ensues even if the tank is equipped with an inlet design in accordance with $E_P$ 1607127 B1, which allows the flow with a variable and therefore at any time energetically improvable area $A_{IN}$ but in a disadvantageous orientation with a generally largely horizontal outflow direction, especially at low loads.

In light of the disadvantages described above in the state of the art, the technical problem is to design an optimized settling tank, which is characterised firstly by the highest possible separation performance under high loads, secondly by better discharge values for all loads, thirdly by a lower internal load increase due to continuous energy optimization and fourthly by a low-interference operation, particularly with regard to unnecessary flow components in the main stream of the tank. The invention that solves the technical problem is based on the realization that at low loads the volume flow flowing out of the inlet structure may not be introduced deeply and as far as possible horizontally into the tank as described in EP 1607127 B1, but that at least a sufficiently large partial flow $Q_i$ must be diverted out of the inlet structure largely vertically or even contrary to the conventional horizontal inflow direction. Thus, if the main flow direction for largely horizontal outflow in dial coordinates is approximately in the direction of two to four o'clock, with low loads at least a part of the inflow that has a negative effect in the main flow should leave the inlet structure approximately in the direction of five o'clock to nine o'clock, in extreme cases up to approximately in the direction of eleven o'clock. This has the advantage that at least part of the turbulence entering volume flow $Q_R$ from the inlet volume flow $Q_{IN}=Q_C+Q_R$ is not conducted directly into and through the tank with the main flow. Thus, this partial stream does not contribute to destabilizing turbulent energy at the sludge level. The at least one inlet opening is located advantageously deep in the tank, especially at low load. At high loads, however, the entire or at least the greater part of the total volume flow $Q_{IN}$ should then be directed largely horizontally, i.e. approximately in the direction of two to four o'clock, so as not to dive too deeply into the tank and stir up sludge already deposited, but also not to rise too high and thus flow into the clear water.

The advantages of the largely vertical outflow from the inlet structure are achieved in a tank where the inlet opening is located near the recess for suctioning sludge—the so-called sludge funnel—when the inflow volume flow is directed in sufficient quantity to the sludge funnel or even directly into it. In a tank where the inlet opening is far from the sludge funnel or where there is no sludge funnel the advantages of the largely vertical outflow are achieved when the incoming volume flow is first introduced directly onto the bottom and between that and a structure limiting the flow upwards into the space below the inlet structure.

The different control of the volume flow at different loads can be achieved either by positioning the edges of the inlet opening relative to each other in such a way that the differently oriented inlet directions result from differently oriented inlet openings or by temporarily passing parts or the entire volume flow through several inlet openings which can be opened or at least partially closed, depending on the load, predominantly horizontally or predominantly vertically out of the inlet structure. The total area $A_{IN}$ of the inlet opening is advantageously variable so that for each inflow quantity it can be optimized at least largely to $Fr_D=1$. Depending on the volume flow and/or density of the discharged suspension, any avoidable destabilizing momentum change in the inlet area can be prevented at the same time as the load-dependent change in direction.

A load-dependent optimum for the alignment of the inflow results from the orientation of the inlet opening varying by changing the relative arrangement of the upper and lower edge of the inlet opening or in a varying division of the total flow into at least two sub-flows $Q_{IN}=Q_C+Q_R=Q_i+Q_{ii}=Q_h+Q_v$. They flow into the tank in at least two different ways, i.e. through at least two different partial surfaces $A_i$ and $A_{ii}$. The partial flows horizontal $Q_h$ and vertical $Q_v$ will generally not have the same ratio as the same total volume flows $Q_C$ and $Q_R$. The varying distribution is supported by measuring the load and adjusting the type and size of the inlet openings of the settling tank to the current load. Complete or partial automatic adjustment, e.g. by utilization of flow forces or differences in density, does not oppose the present technology.

While the above-described devices fulfill their respective, particular objectives and requirements, the aforementioned patents do not describe a settling tank, which serves at least temporarily to separate an at least two-phase suspension.

Therefore, a need exists for a new and novel settling tanks and methods for guiding partial flows in the inflow area of the settling tanks. In this regard, the present technology substantially fulfills this need. In this respect, the settling tanks according to the present technology substantially departs from the conventional concepts and designs of the prior art, and in doing so provides an apparatus primarily developed for the purpose of guiding partial flows in the inflow area of the settling tanks.

BRIEF SUMMARY OF THE PRESENT TECHNOLOGY

In view of the foregoing disadvantages inherent in the known types of settling tanks now present, the present technology provides a novel settling tanks, and overcomes the above-mentioned disadvantages and drawbacks of the prior art. As such, the general purpose of the present technology, which will be described subsequently in greater detail, is to provide a new and novel settling tanks and method which has all the advantages of the prior art mentioned heretofore and many novel features that result in a settling tanks which is not anticipated, rendered obvious, suggested, or even implied by the prior art, either alone or in any combination thereof.

According to one aspect, a task of the present technology can be solved by a process in which a multiphase fluid with an inlet volume flow $Q_{IN}$ leaves the inlet structure into at least one tank through at least one inlet structure and through at least one variably designed inlet opening, with subsequent separation of the phases of different weight into at least one return volume flow $Q_R$ each and an outlet volume flow $Q_C$. In that at least one at least temporary settling tank, characterised in that the inflow $Q_{IN}$ is energetically optimized in or at the inlet structure and by changing the position of the inflow edges of at least one inlet opening to one another or by at least a temporary division into at least two partial flows $Q_h$ and $Q_v$, the inflow $Q_{IN}$ leaves the inlet structure depending on the load situation in a different way or in a different manner or rather in different directions of flow, at high loads mainly in the direction of two to four o'clock and at low loads mainly in the direction of five to eleven o'clock.

According to another aspect, a task of the present technology can be solved by a settling tank, in which a multiphase fluid with an inflow volume flow $Q_{IN}$ is fed into at least one at least temporary settling tank through at least one inlet structure and through at least one variably designed inlet opening, with subsequent separation of the phases of different weight into a return volume flow $Q_R$ and an outflow volume flow $Q_C$, characterized in that the inflow $Q_{IN}$ is energetically optimized in or at the inlet structure to the settling tank. Additionally, by changing the position of the inflow edges of the at least one inlet opening relative to one another or by at least temporary dividing the inflow $Q_{IN}$ into at least two sub-flows $Q_h$ and $Q_v$, the inflow $Q_{IN}$ flows in the tank in a different way or respectively, by changing the position of the inflow edges of at least one inlet opening to one another or rather flows in through different partial surfaces in different flow directions depending on the load situation, predominantly at least mainly in the direction of two to four o'clock under high load and predominantly at least mainly in the direction of four to eleven o'clock under low load.

An advantageous design of a tank results if the inlet opening of the tank inlet structure is defined by two height-variable edges, which are designed in such a way that at least one edge can be led over and also under the elevation of the other edge. For a round inlet structure, for example, this is the case when the inlet opening is defined by a vertically telescoping cylinder and by a vertically relocatable ring plate and the inner diameter of the cylinder is larger than the outer diameter of the ring plate. If the height-variable lower edge of the cylinder is arranged above the current elevation of the upper edge of the ring plate, the two components form the edge of a vertically oriented inlet opening of variable size, which therefore is largely flowed through horizontally and simultaneously can be optimized energetically to the current load. If the lower edge of the cylinder is arranged below the elevation of the upper edge of the ring plate, the two components form the edge of a horizontally oriented inlet opening of variable size, which is therefore mainly flowed through vertically and is also optimized energetically.

Another advantageous design of a tank results if the inlet opening of the inlet structure is defined by two height-variable boundaries, whereby the lower flow boundary is designed in at least two parts. In a lower position, the two parts of the lower flow boundary are at a different elevation, so that a second flowable surface opens between the two parts, which is flowed through by the partial volume flow $Q_V$ that is directed mainly vertically in the direction of five to nine o'clock or even against the main flow direction in the direction of eleven o'clock.

An advantageous design of a round or even a rectangular tank results if the variably designed inlet opening is arranged peripherally at the tank.

The positive beam interference from areas of higher density for the flock filter effect can be promoted by ensuring through a flow guide plate above the inlet that an interference into the incoming suspension flow can only be supplied with higher density suspension from the lower area of the settling tank.

According to another aspect, the present technology can include a method of utilizing a settling tank for controlling an inlet flow of a multiphase fluid for subsequent separation of phases of different weight into at least one return volume flow and an outflow volume flow. The method can include the steps of flowing an inflow of a multiphase fluid in or at an inlet structure. Directing the inflow or a partial volume flow of the inflow out of the inlet structure to create a feed volume flow into at least one settling tank. For a high load condition, the feed volume flow can be directed substantially in a direction of two to four o'clock (60° to 120°) in relation with a clock angle. For a low load condition the feed volume flow can be directed substantially in a direction of five to eleven o'clock (150° to 330°) in relation with a clock angle by changing a position of inflow edges defining an inlet opening in communication with the inlet structure relative to one another or by at least temporarily dividing an inflow area of the inlet opening into differently aligned partial surfaces.

In some embodiments, the method can include the step of detecting an instantaneous load of the settling tank by way of a total load, and adjusting a size of the inlet opening to create a division of the feed volume flow into a first volume flow and a second volume flow and/or an alignment of the inflow by control or regulation dependent of the detected instantaneous load.

According to yet another aspect, the present technology can be a settling tank system including a tank housing defining an interior and including an inlet structure configured to receive a fluid flow, and one or more discharge outlets in communication with the interior. A wall vertically adjustable can be utilized within the interior of the tank housing. The wall can be configured to divert at least a portion of the flow associated with the inlet structure. A plate can be located at a height in relation with the tank, and the plate can be configured to divert at least a portion of the flow associated with the inlet structure. An edge of the plate and an edge of the wall can define an inlet opening in communication with the inlet structure to allow the fluid flow to enter the interior of the tank housing. Adjusting the height of the edge of the wall changes a size of the inlet opening.

In some embodiments, the volume flow leaves the inlet structure into the at least one settling tank through the at least one inlet structure which is configured to continuously optimize the feed volume flow by adapting one or more of the inlet openings, with subsequent separation of the phases of different weight into one return volume flow and one discharge flow rate each, wherein in the partial volume flow of the inflow and up to the entire inflow in or at the inlet structure flows out of the inlet structure at a high load condition substantially in the direction of two to four o'clock and at low load at least the partial flow in the direction of five to eleven o'clock by changing a position of the inflow edges of the inlet opening to one another or by at least temporarily dividing the inflow into differently aligned partial surfaces.

In some embodiments, a size of an associated partial volume flow is controlled for at least one of the inlet openings to the settling tank, by changing a flowed through area by gates or valves which influence a size of the flowed through area or a flow resistance at the flowed through area.

In some embodiments, a first flow through area of the inlet opening is defined by at least one upper device which is variable in its position and thus limits the inlet opening upwards, and at least the first inlet opening with the first flow through area as well as at least one second inlet opening with a second flow through area is defined by at least one further lower limiting device which is variable in its position.

Some embodiments of the present technology can include a device located in or on the inlet structure, which determines an upper boundary of the first inlet opening with the first flow through area, by at least one wall, which is telescoped or folded to an elevation.

Some embodiments of the present technology can include an at least two-part plate device arranged underneath the inlet opening, both a lower edge of the first inlet opening with the first flow through area as well as an upper and a lower boundary of the second inlet opening with the second flow through area are configured to be adjustable at the same time.

In some embodiments, the sizes of the flowed through inlet openings of the first and second flow through areas and thus also the sizes of the partial volume flows associated therewith are configured to be changed by adjusting the positions of the wall and the two-part plate device.

In some embodiments, an upper boundary of the second inlet opening with the second flow through area is set by a lower boundary of a second vertical wall, which is variable or fixed in its position and situated above a lowest point of travel of the two-part plate device, thus the sizes of the partial volume flows being changeable.

In some embodiments, the positions of the wall is configured to be set that at least one of the first and second flow through areas is at least temporarily closed so that a first partial flow equals 0 or a second partial flow equals 0 is capable of being set temporarily for one of the two partial streams at the feed volume flow is greater than 0.

Some embodiments of the present technology can include a rigid or an angle adjustable flow guide plate that is configured to vertically deflect an outflowing volume flow in its lowest position, wherein the outflowing volume flow is guided in an upper position exclusively horizontally.

In some embodiments, the flow guide plates are configured to influence an angle of the outflow by changing an angle of the flow guide plates. The upper device for adjusting the inlet opening influence each other at least partially in a first position and can be fixed at least partially in an end position by attachment points.

In some embodiments, at least one of the partial openings is provided with flow-promoting installations or extensions being round perforated devices or round lamellae.

In some embodiments, the wall includes a deflection guide plate rigidly extends out from the wall or is angularly adjustable in relation to the wall.

In some embodiments, the edge of the wall, when the wall is at an extending position, is at a height lower than the plate, and wherein the height of the plate is adjustable.

In some embodiments, the plate includes a first plate and a second plate. The first plate can extend from an internal wall of the tank housing. The second plate can be configured to be adjustably spaced apart from the first plate. The inlet opening can be a first inlet opening adjustably defined between the edge of the first plate and a first edge of the second plate, and a second inlet opening adjustably defined between the edge of the wall and a second edge of the second plate.

In some embodiments, the first inlet opening can be configured or configurable to create a first volume flow in an angled or vertical direction in relation with the wall, and the second inlet opening can be configured or configurable to create a second volume flow in a horizontal direction.

In some embodiments, the second plate can include an upwardly extending member configured to deflect a portion of the flow pasting through the first inlet opening in an upward or a backward direction.

Some embodiments of the present technology can include a rigid flow deflector plate located in the interior of the tank housing. The flow deflector plate can be configured to direct a volume flow exiting the inlet opening in a vertical direction when the wall is in an extended position.

In some embodiments, the tank housing can include a central inlet feed conduit configured to allow the fluid flow to overflow an edge of the inlet feed conduit and enter the inlet structure that is concentric with the inlet feed conduit. The wall can be concentric with the inlet feed conduit.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is another object of the present technology to provide a new and novel settling tank that may be easily and efficiently manufactured and marketed.

An even further object of the present technology is to provide a new and novel settling tank that has a low cost of manufacture with regard to both materials and labor, and which accordingly is then susceptible of low prices of sale to the consuming public, thereby making such settling tank economically available to the buying public.

Still another object of the present technology is to provide a new settling tank that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIGS. 6a-6b are schematic cross-sectional views of the present technology being independent of whether the inlet structure is arranged in a rectangular or round tank and whether it is arranged in the middle of the tank or peripherally. FIG. 6a shows FIG. 1 peripheral, FIG. 6b shows the same inventive design in a central arrangement as an example.

All illustrations show settling tanks in highly simplified vertical sections. Identical elements are each provided with the same reference signs.

DETAILED DESCRIPTION OF THE PRESENT TECHNOLOGY

Referring now to the drawings, and particularly to FIGS. 1a-9d, embodiments of the present technology are shown and generally designated.

In sedimentation tanks 1, inlet structures 2 are arranged, through whose inlet opening 3 the suspension to be separated flows to the tanks, the height of which can be variably adjusted. In addition to the height variability of the inlet opening, the volumetric flow flowing out of the inlet structure can, depending on the actual load, be directed by forming a horizontally flow-through inlet opening 3a or a vertically flow-through inlet opening 3b and can optionally be divided into horizontal and vertical partial flows $Q_I$ and $Q_{II}$. As a result of the horizontal inflow, the capacity of the sedimentation tank increases at high loads, and as a result of the vertical inflow, the volume flow through the sedimentation chamber and the turbulent energy in the sedimentation chamber decrease at low loads, so that the retention of fine suspension in the sedimentation tank is increased and thus the effluent quality is improved.

Figure 1A:
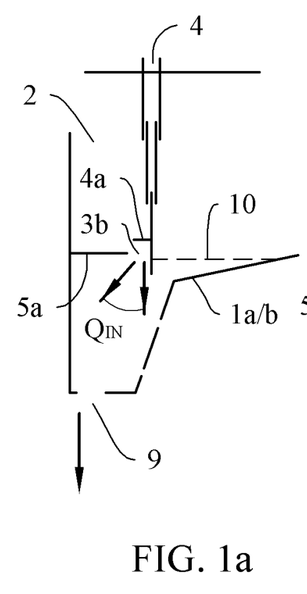
FIG. 1a-1c are schematic cross-sectional views illustrating a round or rectangular settling tank in which an inlet structure with two height-variable edges is arranged, which are designed in such a way that at least one edge can be guided over and also under the elevation of the other edge and thus the inlet flow is guided out of the inlet structure vertically under low load (FIG. 1a) and horizontally under higher load (FIGS. 1b and 1c).
Figure 1B:
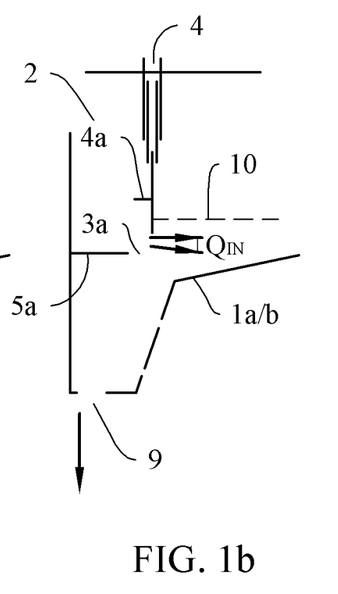
Figure 1C:
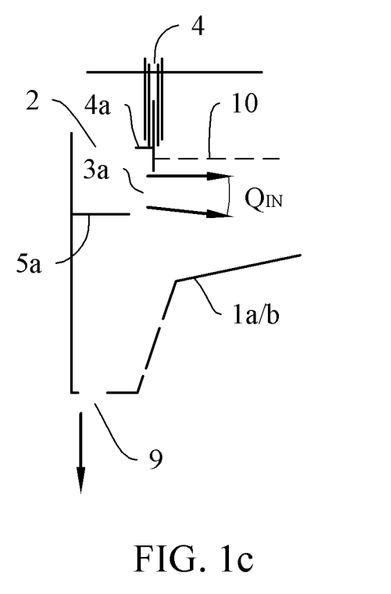

The exemplary and fragmentary illustrated tank 1 shown in FIGS. 1a to 1c which here is either round or rectangular (1a or 1b), has an inlet structure 2 defined by the edges 4 and 5a with an inlet opening 3, which depending on the load and thus depending on the adjusted height of its wall 4 which can be varied in height expansion and its device 5a which can also be varied in height, results either in an inlet opening 3a which is flowed through essentially horizontally or as an inlet opening 3b which is essentially flowed through inclined, vertically or inwards.

FIG. 1a shows a low load situation in which wall 4 extends all the way down and its lower edge is lowered below the elevation of device 5a. The advantage of wall 4 can pass the elevation of device 5a downwards by at least the same amount as the horizontal distance between the outer edge of device 5a and the inner edge of wall 4. This creates an opening 3b, which is inclined inwards at least at an angle of 45° to the horizontal. The parting mirror 10 is low according to the low load. In this configuration, the lower edge of wall 4 and the outer edge of device 5a form an inlet opening 3b, which is essentially flowed through inclined, vertically or inwards.

FIG. 1b shows a situation with a medium load. The parting mirror 10 has risen slightly, wall 4 has shortened so that the lower edge of the elevation is now above the elevation of device 5a. Now the lower edge of wall 4 and the outer edge of device 5a form an inlet opening that is flowed through essentially horizontally in accordance with the task of the present technology. This horizontal alignment of the flow at the inlet opening is supported by the deflection guide plate 4a in the lower area of wall 4, which prevents vertical flow along wall 4 under high load and directs it inwards into the horizontal. As a result, the flow is then directed horizontally outwards towards device 5a.

FIG. 1c shows a high load situation. The parting mirror 10 has risen high up. The wall 4 is now even shorter, device 5a has now also been moved up a bit. Together, wall 4 and device 5a, also supported by deflection guide plate 4a, form an inlet opening which is still essentially horizontally flowed through for high loads, but now in energetic optimization by increased height difference of the elevation of the flow boundaries at higher inflow $Q_{IN}$ with increased inlet expansion $h_{opt}$.

Figure 2A:
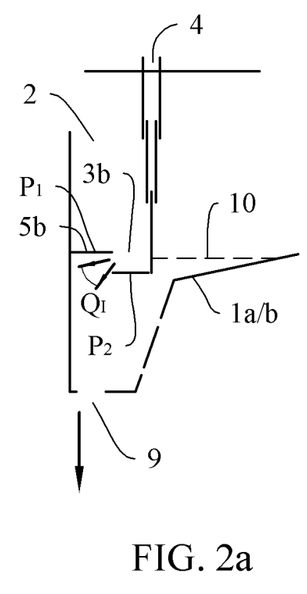
FIGS. 2a-2c are schematic cross-sectional views illustrating a settling tank in which an inlet structure with two height-variable edges is arranged, whereby the lower flow boundary being designed in two parts. In the lowest position the feed flow is introduced vertically as $Q_V$ (FIG. 1a), in the middle position it is divided into a vertical inflow $Q_V$ and a horizontally guided inflow $Q_H$ (FIG. 1a), in the upper position it is guided exclusively horizontally with $Q_H$.
Figure 2B:
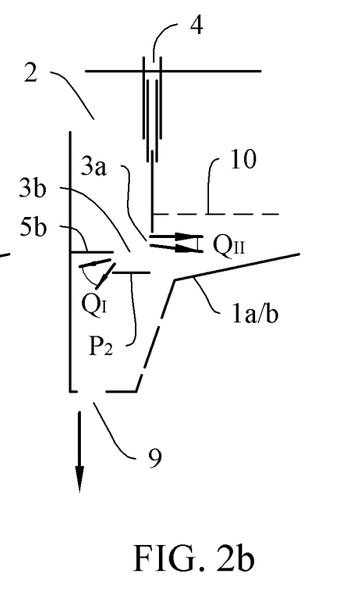
Figure 2C:
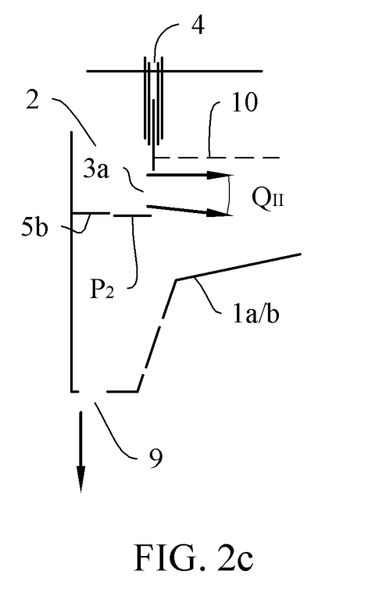

FIGS. 2a to 2c show an inlet structure 2 defined by the edges 4 and 5b with an inlet opening 3a and/or 3b, which, depending on the load and thus depending on the adjusted height of its wall 4, which is variable in height expansion, and its device 5b, which is also variable in height position, results either as an inlet opening 3a (FIG. 2b and FIG. 2c) which is flowed through essentially horizontally or as an inlet opening 3b (FIG. 2a and FIG. 2b) which is flowed through essentially inclined, vertically or inwards. The multi-part lower deflection 5b, which is exemplary as plate P with parts P1 and P2, guides the volume flow $Q_I$ vertically via the inlet openings 3b (FIG. 2a), vertically via inlet openings 3a and 3b (FIG. 2b) simultaneously the volume flows $Q_I$ vertically and $Q_{II}$ horizontally and in FIG. 2c via inlet opening 3a the volume flow $Q_{II}$ horizontally.

Figure 3A:
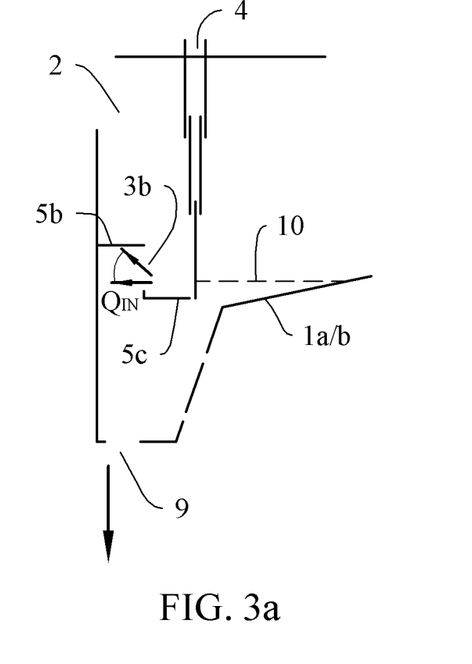
FIGS. 3a-3b are schematic cross-sectional views illustrating a settling tank in which an inlet structure with two height-variable edges and a two-part lower flow boundary is arranged. In the lowest position, the inflow current is directed inwards as $Q_V$ approximately in the direction of nine to eleven o'clock (FIG. 3a), in the upper position it is guided exclusively horizontally with $Q_H$.
Figure 3B:
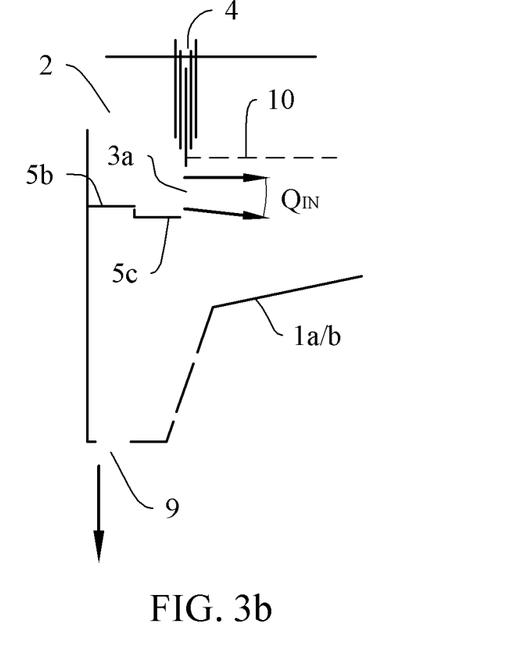

FIGS. 3a and 3b show an inlet structure 2 with multi-part lower deflection with additional flow deflection 5c. In FIG. 3a, the upward flow deflector 5c directs the volume flow backwards in the direction of 9-11 o'clock, while in FIG. 3b the volume flow largely emanated horizontally to the front.

Figure 4A:
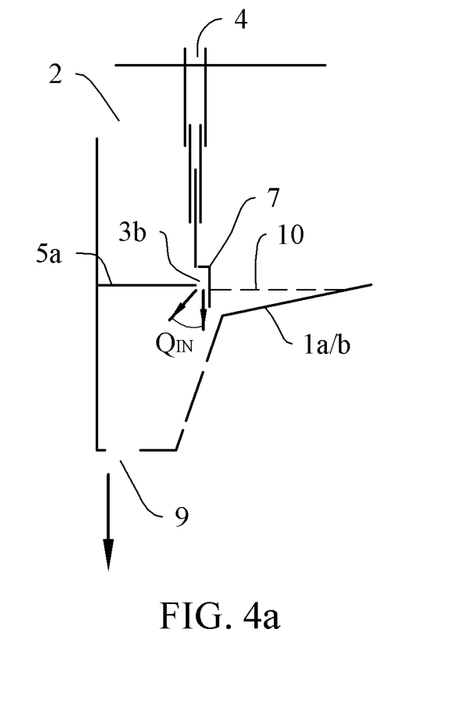
FIGS. 4a-4b are schematic cross-sectional views illustrating a settling tank in which an inlet structure with two height-variable edges and a fixed flow guide plate 7 is arranged. In the lowest position, the inflow current is introduced vertically as $Q_V$ through the vertical deflection of the flow deflector 7 (FIG. 4a), in the upper position it is guided exclusively horizontally with $Q_H$ (FIG. 4a).
Figure 4B:
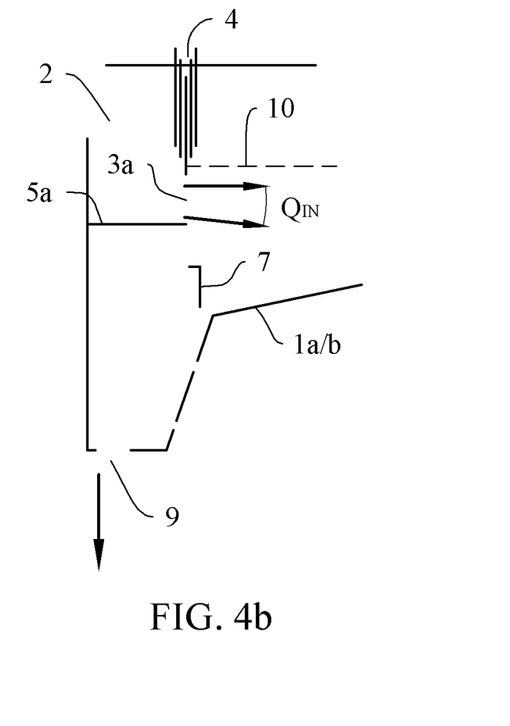

FIGS. 4a and 4b show an inlet structure 2 with a one-piece lower deflection 5a and an additional rigidly arranged flow shield 7. In FIG. 4a, 7 directs the volume flow in a vertical direction, while in FIG. 4b the volume flow emanates largely horizontally to the front.

Figure 5A:
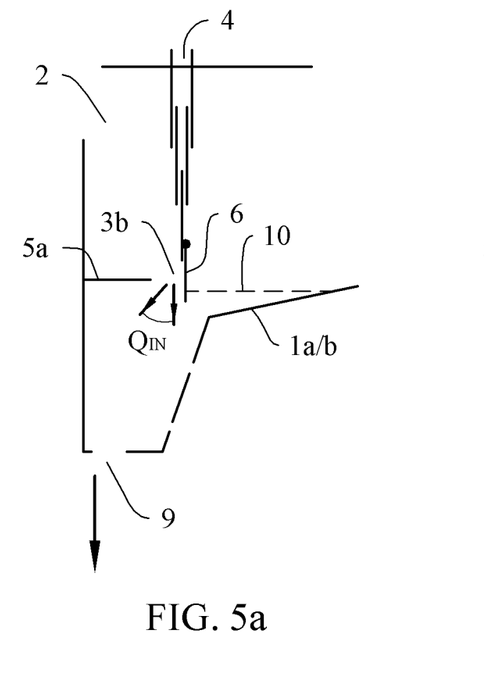
FIGS. 5a-5b are schematic cross-sectional views illustrating a settling tank in which an inlet structure with two height-variable edges and an angle-adjustable flow guide plate 6 at one of the edges is arranged. In the lowest position, the inflow current is introduced vertically as $Q_V$ through the angle-adjustable flow guide plate (FIG. 5a), in the upper position it is guided exclusively horizontally with $Q_H$ (FIG. 5a).
Figure 5B:
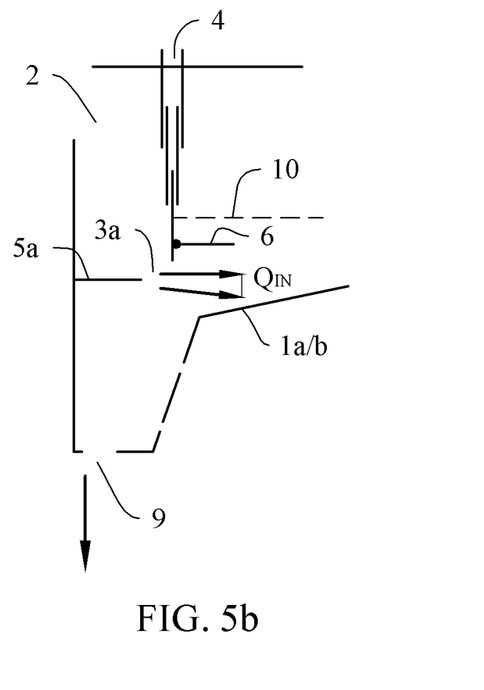

FIGS. 5a and 5b show an inlet structure 2 with a one-piece lower deflection 5a and an additional angle-adjustable flow guide plate 6. In FIG. 5a, the flow guide plate 6 directs the volume flow in a vertical direction, while in FIG. 5b the volume flow emanates largely horizontally to the front.

Figure 6A:
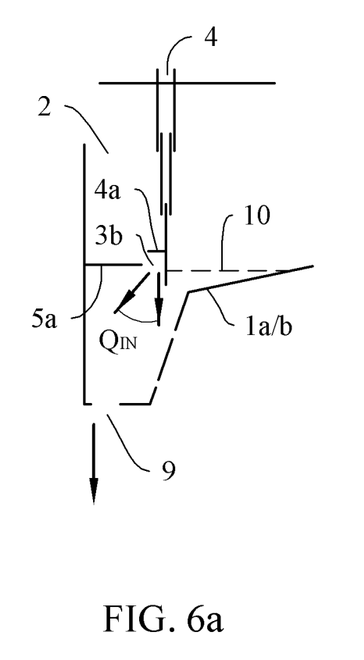
Figure 6B:
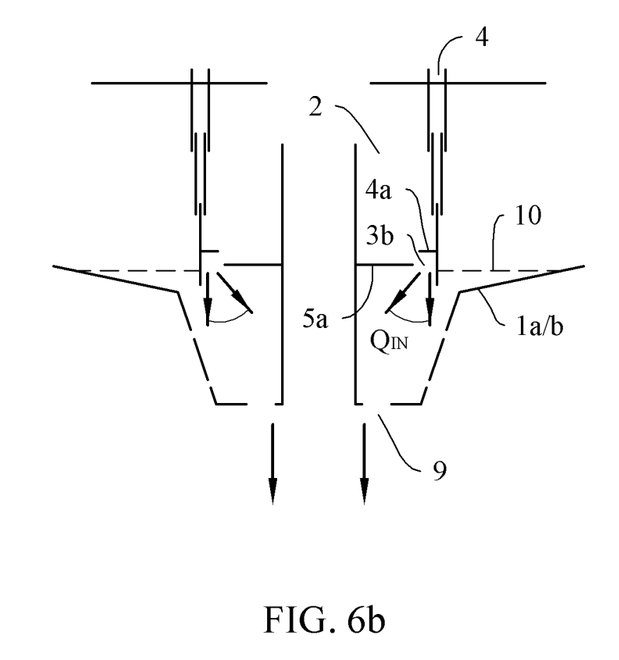

FIGS. 6a and 6b show that the same inventive features are possible in peripheral design (FIG. 6a) as well as in central design (FIG. 6b).

Figure 7A:
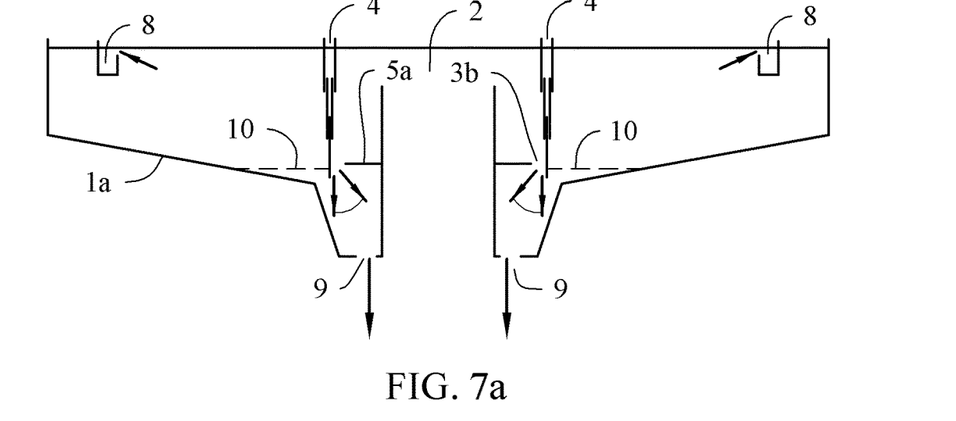
FIG. 7a-7c are schematic cross-sectional views illustrating different settling tank geometries of the present technology.
Figure 7B:
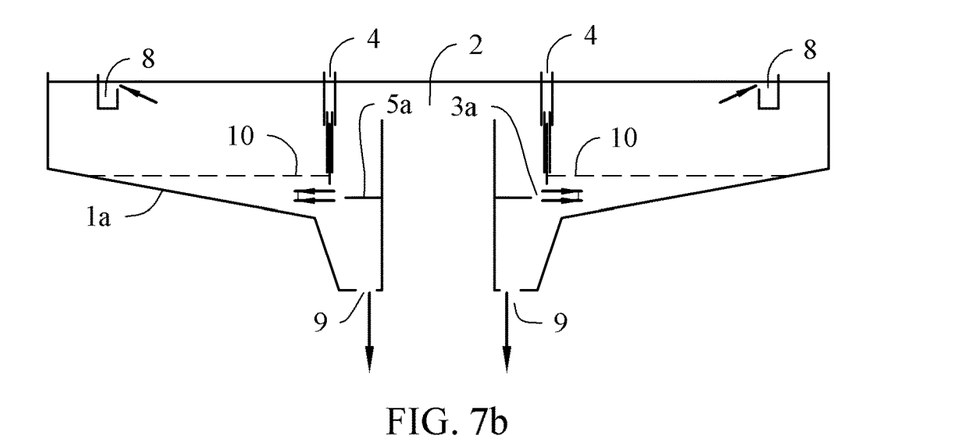
Figure 7C:
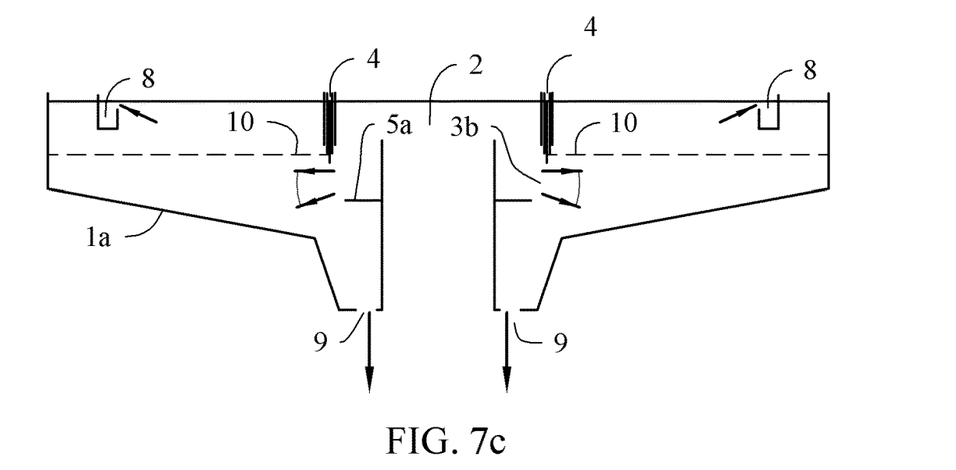
Figure 8A:
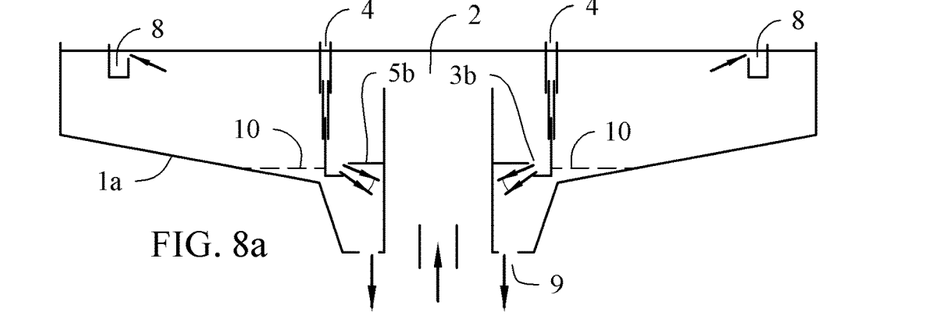
FIG. 8a-8d are schematic cross-sectional views illustrating different settling tank geometries of the present technology.
Figure 8B:
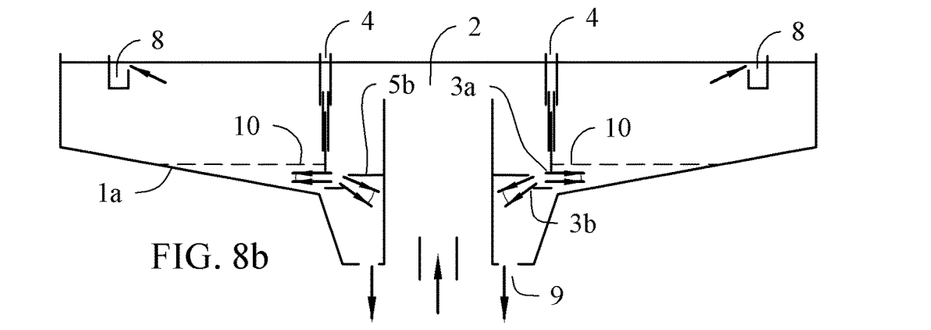
Figure 8C:
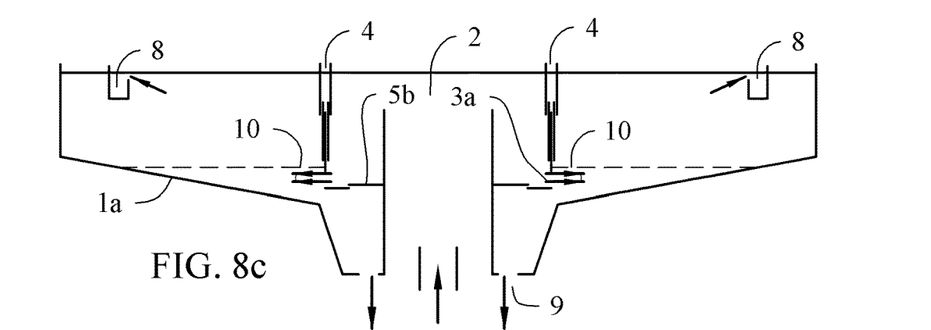
Figure 8D:
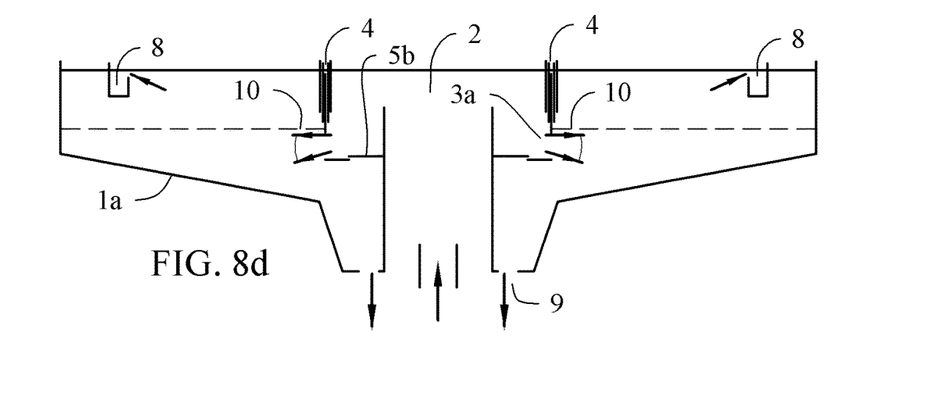
Figure 9A:
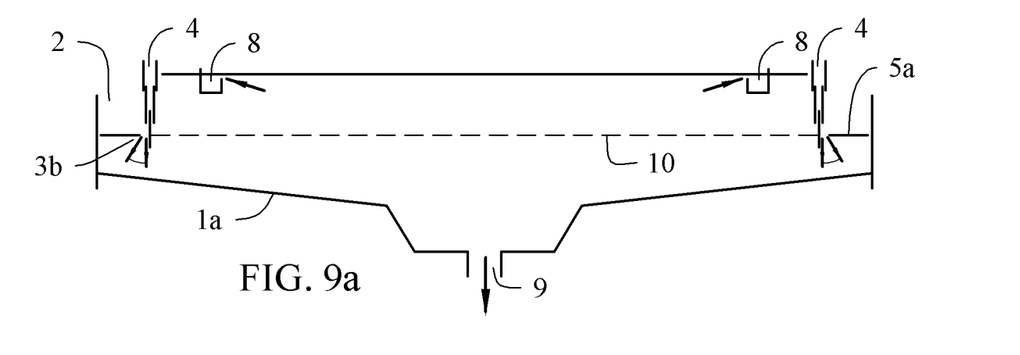
FIG. 9a-9d are schematic cross-sectional views illustrating different settling tank geometries of the present technology.
Figure 9B:
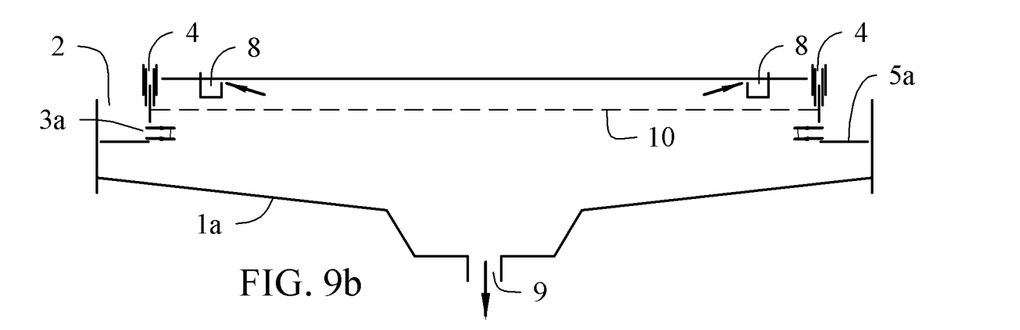
Figure 9C:
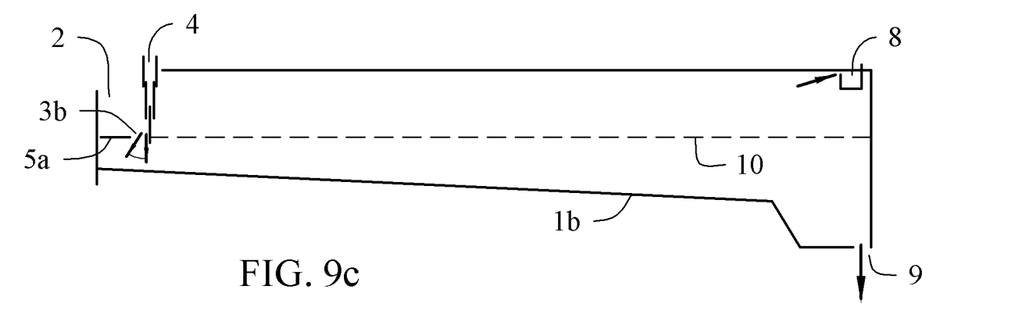
Figure 9D:
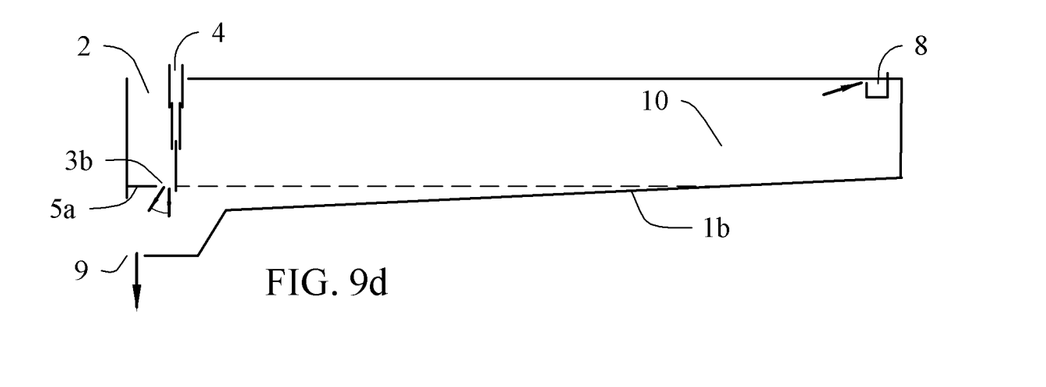

FIGS. 7, 8 and 9 illustrate once again in schematic cross-sections through different settling tank geometries that the inventive features are not dependent on the tank geometry and apply, for example, in central design for a round settling tank (FIG. 7 and FIG. 8) and in peripheral design for round (FIGS. 9a and 9b) and rectangular settling tanks (FIGS. 9c and 9d).

It can be appreciated that clear or clean water can be discharged from the tank by way of clear water discharge 8, and sludge can be discharged from the tank by way of sludge discharge 9.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

COMPOSITION OF THE REFERENCE SIGNS

1a Round tank
1b Rectangular tank
2 Inlet structure
3 Inlet opening
3a Inlet opening with essentially horizontal flow
3b Inlet opening, flowed through essentially at an angle, vertically or inwards 4 A wall that can be adjusted in its height or vertical extent
4a Deflection guide plate in the lower area of wall 4
5a single-part or multi-part device as lower and temporarily as inner deflection
5b multi-part device as lower deflection in the form of a plate P with parts $P_1$ and $P_2$, temporarily as flow divider in volume flows $Q_I$ and $Q_{II}$ and then simultaneously flow boundary for volume flow $Q_{II}$
5c Device corresponding to 5b, with additional upward flow deflection for volume flow $Q_{II}$
6 Angle-adjustable flow deflector plate
7 Rigidly arranged flow deflector plate
8 Clear water discharge
9 Sludge discharge
10 Parting mirror
P Plate with partial plates $P_1$ and $P_2$
$Q_{IN}$ Inlet volume flow
$Q_I$ Partial volume flow, which flows through the partial area with area $A_I$
$Q_{II}$ Partial volume flow, which flows through the partial area with area $A_{II}$

What is claimed as being new and desired to be protected by Letters Patent of the United States is as follows:

1. A method of utilizing a settling tank for controlling an inlet flow of a multiphase fluid for subsequent separation of phases of different weight into at least one return volume flow and an outflow volume flow, said method comprising the steps of:
   a) flowing an inflow of the multiphase fluid in or at an inlet structure in part defined by a wall vertically adjustable within an interior of a tank housing of at least one settling tank, and a plate adjustably locatable at a height in relation with the tank housing of the at least one settling tank; and
   b) directing the inflow or a partial volume flow of the inflow out of one or more inlet openings defined by inflow edges of the inlet structure to create a feed volume flow into the at least one settling tank;
   wherein for a high load condition at least a partial volume flow of the feed volume flow is directed substantially in a direction forwardly away from the one or more inlet openings between two to four o'clock (60° to 120°) in relation with a clock angle; and
   wherein for a low load condition the feed volume flow is directed substantially in a direction vertically or rearwardly away from the one or more inlet openings between five to eleven o'clock (150° to 330°) in relation with a clock angle by changing a position of the inflow edges defining the one or more inlet openings in communication with the inlet structure relative to one another or by at least temporarily dividing an inflow area of the one or more inlet openings into differently aligned partial surfaces.

2. The method according to claim 1 further comprising the step of:
   detecting an instantaneous load of the at least one settling tank by way of a total load; and
   adjusting a size of the one or more inlet openings to create a division of the feed volume flow into a first volume flow and a second volume flow and/or an alignment of the inflow by control or regulation dependent of the detected instantaneous load.

3. A settling tank system for carrying out the method according to claim 1, in which the multiphase fluid with feed volume flow leaves the inlet structure into the at least one settling tank through the inlet structure which is configured to continuously optimize the feed volume flow by adapting the one or more inlet openings, with subsequent separation of the phases of different weight into the one return volume flow and the outflow volume flow, wherein in the partial volume flow of the inflow and up to an entire inflow in or at the inlet structure flows out of the inlet structure at a high load condition substantially in the direction forwardly away from the one or more inlet openings between two to four o'clock and at low load at least the partial volume flow in the direction vertically or rearwardly away from the one or more inlet openings between five to eleven o'clock by changing a position of the inflow edges of the one or more inlet openings to one another or by at least temporarily dividing the inflow in partial volume flows leaving the inlet structure through differently aligned partial surfaces.

4. The settling tank according to claim 3, wherein a size of an associated partial volume flow is controlled for the one or more inlet openings to the at least one settling tank, by changing a flowed through area by gates or valves which influence a size of the flowed through area or a flow resistance at the flowed through area.

5. The settling tank according to claim 3, wherein a first flow through area of a first inlet opening is defined by the plate which is variable in its position and thus limits the one or more inlet openings upwards, and at least the first inlet opening with the first flow through area as well as at least one second inlet opening with a second flow through area is defined by at least one further lower limiting device which is variable in its position.

6. The settling tank according to claim 5 further comprising a device located in or on the inlet structure which determines an upper boundary of the first inlet opening with the first flow through area by the wall, which is telescoped or folded to an elevation.

7. The settling tank according to claim 6 further comprising an at least two-part plate device arranged underneath the one or more inlet openings, both a lower edge of the first inlet opening with the first flow through area as well as an upper and a lower boundary of the second inlet opening with the second flow through area are configured to be adjustable at the same time.

8. The settling tank according to claim 7, wherein sizes of the first and second flow through areas and also a size of the partial volume flow associated therewith are configured to be changed by adjusting the positions of the wall and the two-part plate device.

9. The settling tank according to 7, wherein an upper boundary of the second inlet opening with the second flow through area is set by a lower boundary of a second vertical wall, which is variable or fixed in its position and situated above a lowest point of travel of the at least two-part plate device, thus a size of the partial volume flow being changeable.

10. The settling tank according to 9, wherein the at least two-part plate device is configured such that at least one of the first and second flow through areas are at least temporarily closed so that a first partial flow equals zero (0) or a second partial flow equals zero (0) is capable of being set temporarily for one of two partial streams at the feed volume flow is greater than zero (0).

11. The settling tank according to claim 3 further comprising a flow guide plate that is configured to vertically deflect the feed volume flow to the five to eleven o'clock direction in a lowest position, wherein the feed volume flow is guided horizontally to the two to four o'clock direction when in an upper position, wherein the flow guide plate is a rigid flow guide plate or an angle adjustable flow guide plate.

12. The settling tank according to claim 11, wherein the flow guide plate is the angle adjustable flow guide plate and is configured to influence an angle of the feed volume flow by changing an angle of the angle adjustable flow guide plate, and wherein the plate for adjusting the one or more inlet openings influence each other at least partially in a first position and is fixed at least partially in an end position by attachment points.

13. The settling tank according to claim 3, wherein at least one of the inlet structure, a first inlet opening and a second inlet opening is provided with flow-promoting installations or extensions being round perforated devices or round lamellae.

14. A settling tank system comprising:
a tank housing defining an interior and including an inlet structure configured to receive a fluid flow, and one or more discharge outlets in communication with the interior;
a wall vertically adjustable within the interior of the tank housing, the wall being configured to divert at least a portion of the fluid flow associated with the inlet structure; and
a plate located at a height in relation with the tank housing, the plate being configured to divert at least a portion of the fluid flow associated with the inlet structure;
wherein an edge of the plate and an edge of the wall define an inlet opening in communication with the inlet structure to allow the fluid flow to enter the interior of the tank housing;
wherein adjusting the a height of the edge of the wall changes a size of the inlet opening;
wherein the inlet opening is configured to direct for a high load condition at least a partial volume flow of the fluid flow in a direction forwardly away from the inlet opening between two to four o'clock (60° to 120°) in relation with a clock angle; and
wherein the inlet opening is configured to direct for a low load condition the fluid flow in a direction of vertically or rearwardly away from the inlet opening between five to eleven o'clock (150° to 330°) in relation with a clock angle by changing a position of at least one of the edge of the plate and the edge of the wall that defines the inlet opening in communication with the inlet structure relative to one another or by at least temporarily dividing an inflow area of the inlet opening into differently aligned partial surfaces.

15. The system according to claim 14, wherein the wall includes a deflection guide plate rigidly extends out from the wall or is angularly adjustable in relation to the wall.

16. The system according to claim 14, wherein the edge of the wall, when the wall is at an extending position, is at a height lower than the plate, and wherein the height of the plate is adjustable.

17. The system according to claim 14, wherein the plate includes a first plate extending from an internal wall of the tank housing, and a second plate configured to be adjustably spaced apart from the first plate, and wherein the inlet opening is a first inlet opening adjustably defined between the edge of the first plate and a first edge of the second plate, and a second inlet opening adjustably defined between the edge of the wall and a second edge of the second plate.

18. The system according to claim 17, wherein the first inlet opening is configured or configurable to create a first volume flow in an angled or vertical direction in relation with the wall, and the second inlet opening is configured or configurable to create a second volume flow in a horizontal direction.

19. The system according to claim 18, wherein the second plate includes an upwardly extending member configured to deflect a portion of the fluid flow pasting through the first inlet opening in an upward or a backward direction.

20. The system according to claim 14 further comprising a rigid flow deflector plate located in the interior of the tank housing, the flow deflector plate is configured to direct a volume flow exiting the inlet opening in a vertical direction when the wall is in an extended position.

* * * * *